(12) United States Patent
Stockdale

(10) Patent No.: US 6,875,109 B2
(45) Date of Patent: *Apr. 5, 2005

(54) MASS STORAGE DATA PROTECTION SYSTEM FOR A GAMING MACHINE

(75) Inventor: Jim Stockdale, Clio, CA (US)

(73) Assignee: IGT, Reno, NV (US)

( * ) Notice: Subject to any disclaimer, the term of this patent is extended or adjusted under 35 U.S.C. 154(b) by 456 days.

This patent is subject to a terminal disclaimer.

(21) Appl. No.: 09/818,089

(22) Filed: Mar. 26, 2001

(65) Prior Publication Data

US 2002/0002080 A1 Jan. 3, 2002

Related U.S. Application Data

(63) Continuation-in-part of application No. 09/338,262, filed on Jun. 22, 1999, now Pat. No. 6,488,581.

(51) Int. Cl.[7] .................................................. A63F 9/24
(52) U.S. Cl. .......................................... 463/29; 463/43
(58) Field of Search ......................... 463/43, 29; 380/3, 380/4, 5, 49; 360/60; 711/163, 112; 395/186

(56) References Cited

U.S. PATENT DOCUMENTS

| | | | |
|---|---|---|---|
| 4,091,418 A | * 5/1978 | Ciciora ........................ | 348/614 |
| 4,727,544 A | * 2/1988 | Brunner et al. ............... | 463/29 |
| 5,126,890 A | 6/1992 | Wade et al. | |
| 5,268,960 A | * 12/1993 | Hung et al. .................. | 713/200 |
| 5,513,337 A | 4/1996 | Gillespie | |
| 5,559,993 A | * 9/1996 | Elliott et al. ................. | 711/163 |
| 5,564,036 A | * 10/1996 | Sugai ........................... | 711/152 |
| 5,657,445 A | 8/1997 | Pearce | |
| 5,668,973 A | 9/1997 | Stutz et al. | |
| 6,101,586 A | 8/2000 | Ishimoto et al. | |
| 6,272,533 B1 | * 8/2001 | Browne ........................ | 709/213 |
| 6,488,581 B1 | * 12/2002 | Stockdale .................... | 463/29 |

OTHER PUBLICATIONS

"IDE" PCUGR Handbook—Glossary. [Retrieved on Oct. 11, 2000.] Retrieved from the Internet: <URL:http://pcu-gr.org/handbook/glossary.htm>.p. 11.
Berg et al., "Method and Apparatus for Inhibiting a Selected IDE Command", U.S. Appl. No. 09/573,663, filed May 18, 2000, 50 Pages.
Fujitsu IDE Hard Disk Drives, http://www.adfa.oz.au, Printed from website on Feb. 18, 2000, 3 Pages.
3.5" Ultra DMA Electronic Disk ™ Flash Disk and Solid State Disk Storage Solution, http://www.bitmicro.com, Printed from website on Feb. 18, 2000, 7 Pages.

* cited by examiner

Primary Examiner—Julie Brocketti
(74) Attorney, Agent, or Firm—Beyer, Weaver & Thomas LLP

(57) ABSTRACT

A mass storage data protection system for use with a mass storage device in a gaming machine to protect the mass storage device from unauthorized commands. The mass storage data protection system includes a mass storage device command latch, a timing circuit for timing signals between the mass storage device command latch and the mass storage device, a comparator and a comparator command register in communication with the comparator. The comparator command register includes commands that generate a fault within the mass storage data protection system such that when the comparator receives a command from the mass storage device command latch corresponding to the command within the comparator command register, a fault is generated within the mass storage command latch.

14 Claims, 3 Drawing Sheets

MASS STORAGE DATA PROTECTION SYSTEM FOR A GAMING MACHINE

CROSS REFERENCE TO RELATED APPLICATIONS

This application is a continuation-in-part of U.S. patent application Ser. No. 09/338,262, filed Jun. 22, 1999 now U.S. Pat. No. 6,488,581.

BACKGROUND OF THE INVENTION

1. Field of the Invention

The present invention relates to a mass storage data protection system, and more particularly, to a mass storage data protection system for use with a mass storage device in a gaming machine to protect the mass storage device from unauthorized commands.

2. Description of the Prior Art

Regulations within the gaming industry have historically proscribed "writable" memory devices for the storage of computer codes that control the payoff aspects associated with a gaming machine. These code routines are so critical to operation that their corruption, either accidentally or deliberately, could result in cheating players. If such corruption occurred, even infrequently, it could pose a significant threat to the integrity of gaming operations. The storage of these codes is typically handled by a less volatile type of memory device, such as a ROM or EPROM.

As the gaming industry moves toward game designs that utilize more multimedia style game presentation, the need for increased memory storage for game codes, graphics, sound, video etc., grows dramatically. Quickly, the use of EPROM style devices for data storage is becoming a significant burden and hindrance to the development of the gaming machines with enhanced capabilities. The use of cost effective, higher density mass storage devices will thus become necessary.

In the personal computer industry, the need for large amounts of nonvolatile mass storage has not been nearly as significant. In fact, the opposite scenario is actually occurring. Current personal computer operating systems rely on the fact that data can be stored on the mass storage devices such as hard disks. This allows these operating systems to support virtual memory configurations, storage of recent web sites visited, storage of temporary recovery files in the event of a power interruption, etc.

In earlier generations of hard disk drives that utilize the intelligent drive electronics (IDE) style of system interface, it was not uncommon for these drives to be equipped with write protection jumpers to allow the disk to be write protected against data loss or modification. As the need for cost reduction in the computer industry increased, these jumpers were eliminated since the primary personal computer operating systems do not require them. Thus, in today's market, it is nearly impossible to find an IDE disk drive (the industry's most cost effective mass storage solution) that includes a write protection jumper.

SUMMARY OF THE INVENTION

In accordance with the present invention, a mass storage data protection system for use with a mass storage device in a gaming machine includes a mass storage device command latch, a timing circuit for timing signals between the mass storage device command latch and the mass storage device, a comparator between the mass storage device command latch and the timing circuit, and a comparator command register in communication with the comparator. The comparator command register includes commands that generate a fault within the mass storage data protection system. When the comparator receives a command from the mass storage device command latch corresponding to a command within the comparator command register, a fault is generated within the mass storage command latch.

In accordance with one aspect of the present invention, the mass storage data protection system further includes a control and status register in communication with the comparator command register and the comparator. The control and status register is configured to at least partially control functioning of the mass storage data protection system.

In accordance with another aspect of the present invention, the timing circuit includes a synchronizer and a reset generator.

In accordance with a further aspect of the present invention, the comparator command register includes a fixed command array and a user command array.

In accordance with yet another aspect of the present invention, the mass storage device consists of an IDE hard disk drive and the mass storage device command latch consists of an IDE command latch.

Accordingly, the present invention provides a mass storage data protection device for use in a gaming machine that allows for the use of "off the shelf" cost effective mass storage solutions.

Additionally, the present invention provides the ability to control access to data stored on the mass storage medium in order to prevent unauthorized or accidental modification but allow data modification under controlled system administrative conditions, thereby maintaining gaming machine security.

Furthermore, the present invention provides for the ability to detect an attempted data modification and stop execution of the gaming code in response thereto.

Additionally, the present invention provides for the ability to extend the capabilities of the circuit by the use of programmable registers. This allows for the use of mass storage devices that provide a "super set" of the functionality controlled by the basic circuit.

DETAILED DESCRIPTION OF THE PREFERRED EXEMPLARY EMBODIMENTS

Figure 2:
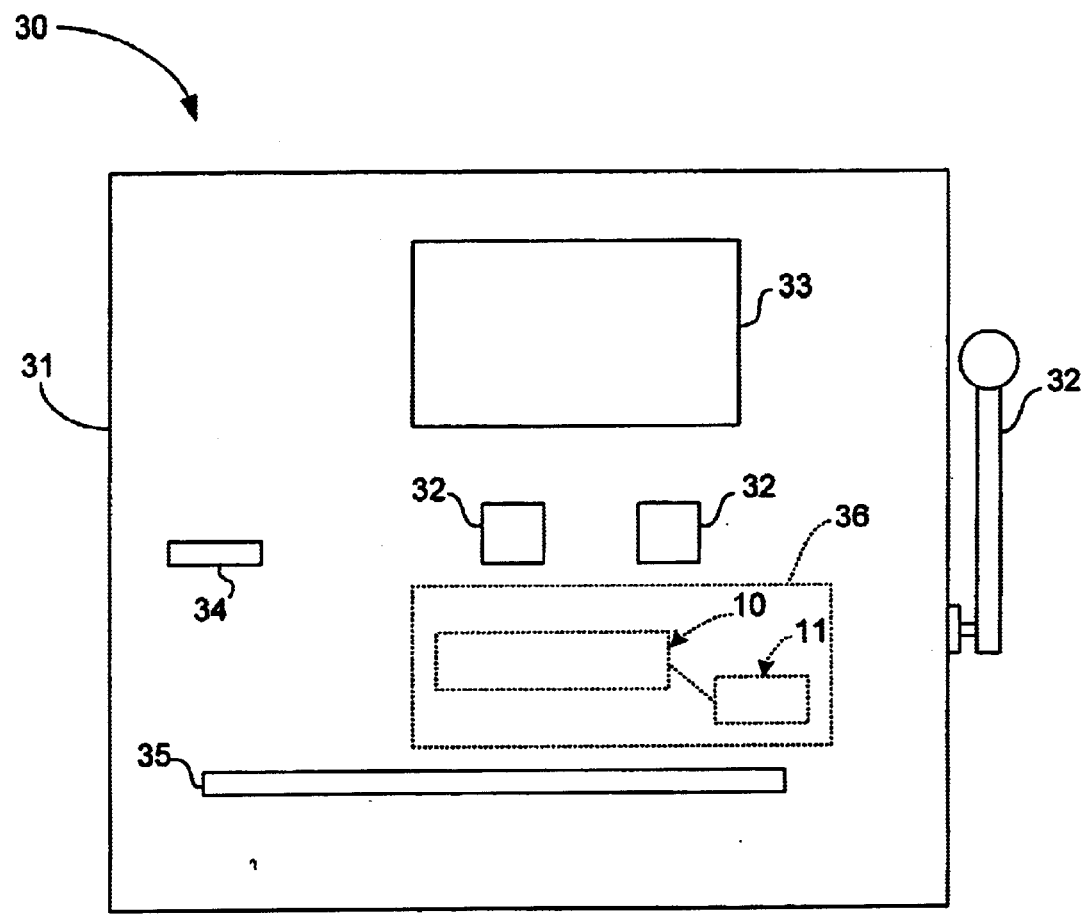
FIG. 2 is a schematic illustration of a gaming machine including a mass storage data protection system in accordance with the present invention.

FIG. 2 illustrates a gaming machine 30 that includes a housing 31, at least one user input 32 coupled to the housing, a display 33, such as, for example, a CRT, LCD or plasma display, coupled to the housing, a money input 34 and a money output 35. The gaming machine includes a control system 36 that includes a data mass storage device 11 and a mass storage data protection system 10 in accordance with the present invention.

Figure 3:
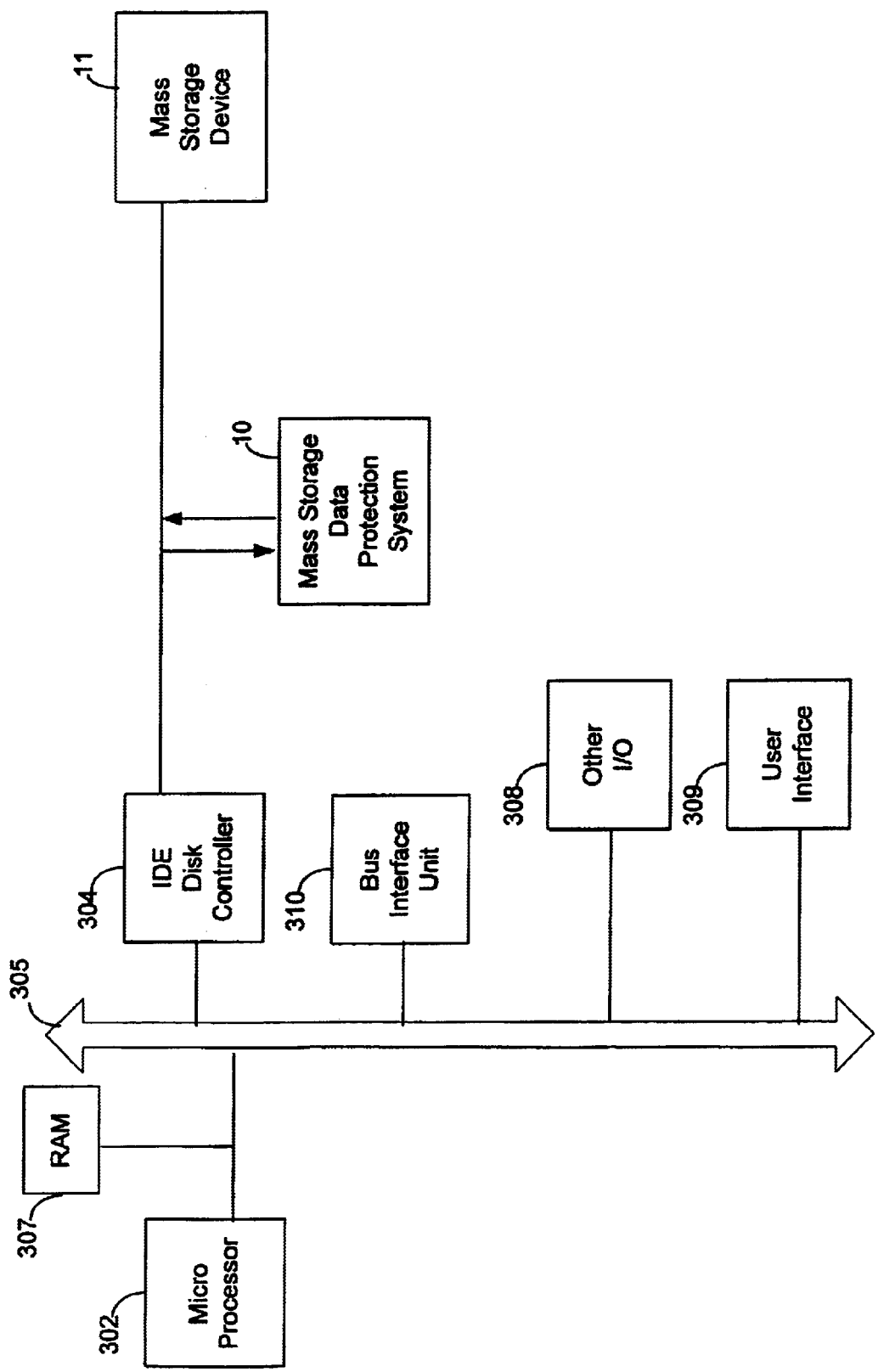
FIG. 3 is a schematic illustration of a master control processor for a gaming machine incorporating a mass storage data protection system in accordance with the present invention.

FIG. 3 schematically illustrates control system 36. Microprocessor 302 executes operating software for the gaming machine. During operation, microprocessor 302 communicates with mass storage device 11 via PCI bus 305, intelligent drive electronics ("IDE") interface controller 304, and mass storage data protection system 10. Microprocessor 302 communicates with mass storage data protection system 10 via PCI bus 305 and bus interface unit 310. Microprocessor 302 also communicates with user interface 309, which for the gaming machine shown in FIG. 2 includes user input 32, display 33, money input 34 and money output 35. Microprocessor 302 may also communicate with other devices such as memory (RAM) 307, as well as other memory and I/O devices 308 which may include serial or parallel ports, a universal serial bus, a floppy disk drive, or other types of memory and I/O devices. Those skilled in the art will recognize that other configurations for the master control system are possible.

Mass storage data protection system 10 will now be described in detail. Since the primary protection of the mass storage device in a gaming machine is to prevent unauthorized writing to the mass storage device, the system will be described with reference to protecting the mass storage device from unauthorized write commands. However, those skilled in the art will understand that other commands, as desired, may also be included for protection of the mass storage device.

Additionally, system 10 is being described herein for providing protection for a single mass storage channel. System 10 would need to be replicated to protect additional channels.

Figure 1:
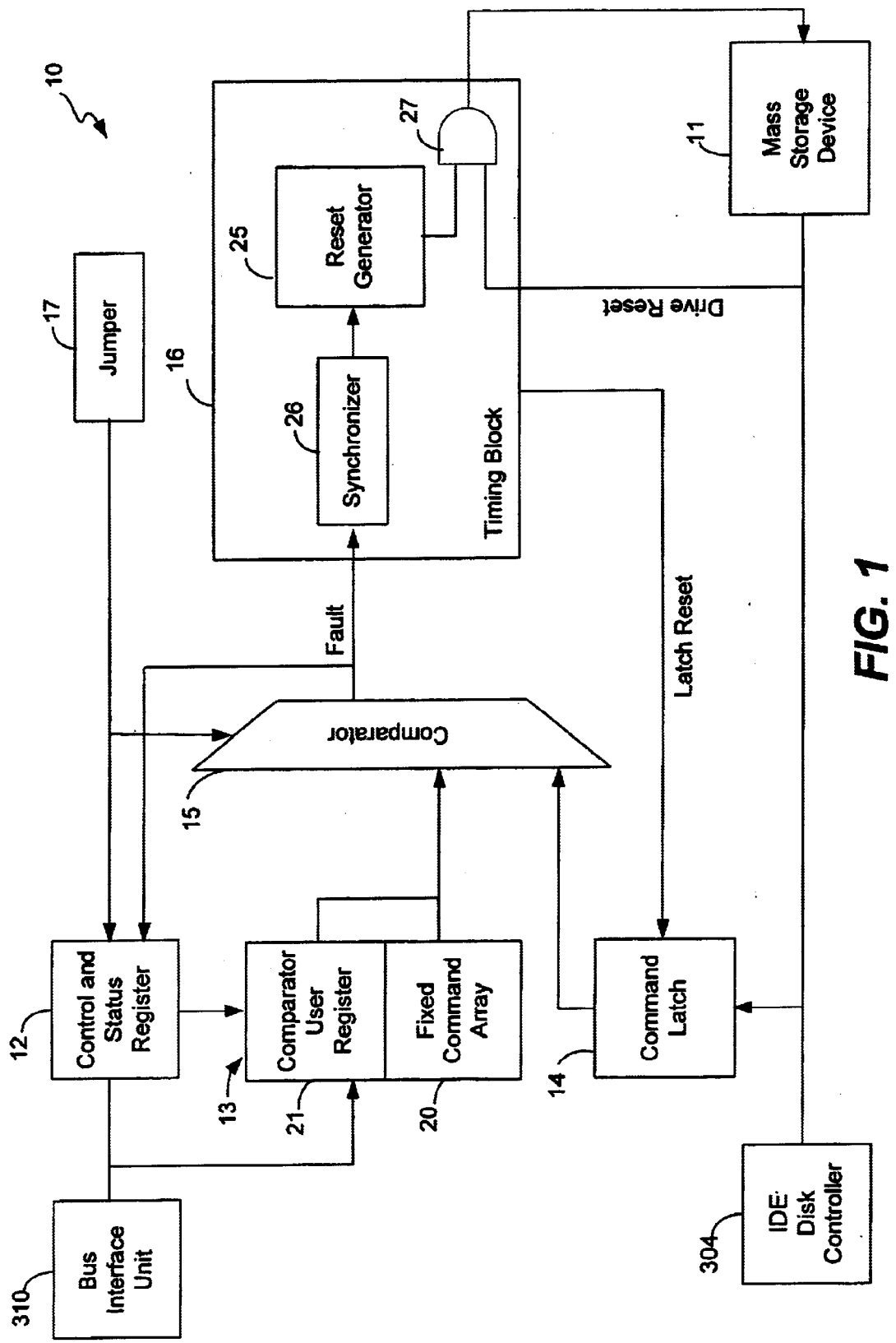
FIG. 1 is a schematic illustration of a mass storage data protection system in accordance with the present invention.

FIG. 1 schematically illustrates a preferred embodiment of mass storage data protection system 10. The system preferably consists of a control and status register 12, a comparator command register 13, a command latch 14, a command comparator 15, and a timing block 16.

In a preferred embodiment, mass storage data protection circuit 10 includes control and status register 12 that provides information regarding the function of the circuit. Preferably, the control and status register is an 8 bit register. Bits 0 and 1 preferably serve as the comparator user register address pointer.

Bit 5 preferably is used to determine when a write fault that is generated should be a non-maskable interrupt (NMI). If this bit is set high, then any faults generated by the data protection circuit will be an NMI. If faults are going to be used to create NMIs, then the system must deal with any write faults. Hence, this bit and NMIs are used to make the system an active one as opposed to a passive one. Preferably, this bit may be set high or low by microprocessor 302 in accordance with operating software instructions.

Bit 6 preferably indicates the state of write-enable jumper 17, which may be a jumper plug and pinheads, a switch, or other device for changing the state of the write-enable signal. If bit 6 is high then the jumper is removed and the data protection system is activated, i.e., it is set to write protect. If the bit is low then the jumper is installed and the data protection system is not activated, i.e., data may be written to the mass storage device. Preferably, microprocessor 302 queries this bit in accordance with operating software instructions to determine whether write operation is allowed.

Finally, bit 7 preferably becomes high whenever a data write is attempted to the mass storage device and the jumper is removed. In order to clear the bit, a 1 must be purposefully written to the bit location. Preferably, microprocessor 302 queries this bit in accordance with operating software instructions to determine whether an attempt to write to mass storage device 11 has been detected.

The remaining bits may be unused or used as desired.

Comparator command register 13 includes a fixed command array 20 and preferably includes a comparator user register 21. Fixed command array 20 includes ANSI commands that are directed to write commands. The write commands are preferably set by the ATA (AT attachment) device interface specification, which currently is the general industry standard that defines command sets. Comparator user register 21 is a register through which additional commands to be excluded may be loaded into command comparator 15. In the preferred embodiment, up to four additional commands may be loaded into comparator user register 21 to cause a write fault if sent to the mass storage device. The individual user comparator registers may be read or written by setting the address in the control and status register 12 and then reading or writing the comparator user register access port. Generally, if the system includes a comparator user register, upon start-up of the mass storage data protection system, the comparator user register will have to be initialized in order to determine the commands needed.

As noted above, comparator user register 21 is used to store additional command values that must not be executed. Thus, the purpose of the comparator user registers is to include vendor-specific commands that could cause data to be modified on the mass storage device 11. A preferred sequence of operating software execution includes querying the mass storage device to identify itself, comparing the identification to entries in a table of valid devices, and then loading the user registers with those vendor-specific commands that will cause data modification. As noted previously, up to four additional vendor-specific commands may preferably be added to the comparator command register. Preferably, these registers are initialized to FF at reset.

Command latch 14 is connected to the bus of the respective channel that is being protected in the mass storage device. Command latch 14 stores the data values written by the disk controller 304 to the mass storage device command register. Values that are written to the command latch 14 are compared with values stored in the command comparator 15 to determine if a write fault and device reset should be generated. Commands are stored in this latch only if the write enable jumper signal is high, i.e., the jumper 17 is removed. If this signal is low, it signals that the write enable jumper is installed and that device writes are currently being allowed and thus it is not necessary to monitor commands.

In a preferred embodiment, mass storage device 11 is an IDE hard disk drive and command latch 14 is an IDE command latch.

Timing block 16 of the mass storage data protection system preferably includes a reset generator 25 and a synchronizer 26. Reset generator 25 is responsible for generating a reset signal to the channel on which a write fault has occurred. If the command comparator circuit detects that a write operation is attempted, it signals the reset generator to send a reset pulse to the channel. Preferably, the reset generator uses a 14.318 MHz input clock that is available in the mass storage data protection system. Preferably, the input clock is divided by 512 to generate a 35.8 microsecond wide reset pulse. Currently, the minimum specification for the reset pulse to an IDE device is 25 microseconds. The reset generator also generates a reset to the IDE device by logically "ORing" the system reset with the reset generator reset in OR gate 27. This allows the IDE device to be reset at power up or power down. Synchronizer 26 is provided for synchronizing between asynchronous and synchronous signals provided from comparator 15 and provided to reset generator 25. Those skilled in the art will understand that other arrangements or circuits may be used for timing block 16, such as for example logic circuits.

The command comparator 15, as noted above, compares the values written to the command latch 14 with values stored in the comparator command register 13. If a successful comparison takes place, a signal is sent to the device reset generator to cause a device reset to occur. Additionally, the comparator sets the write fault bit 7 in the control and status register 12 high.

The operation of system 10 will now be summarized. In normal operation, i.e., when jumper 17 is removed, attempting to write data to mass storage device 11 is not allowed. Detection of an attempt to write data by system 10 causes immediate cessation of gaming operation and transfer of control to error handling routines.

Normal operation preferably proceeds as follows. Upon application of power to the system, fixed command array 20 is operational and system 10 actively monitors commands sent from IDE controller 304 to mass storage device 11. Commands that cannot modify data on the mass storage device 11 are allowed to be executed without disturbance by system 10. Commands that can modify data on the mass storage device 11 are contained within fixed command array 20 and are recognized and disallowed by comparator 15, which asserts a fault signal that causes assertion of the mass storage device reset signal. Assertion of this signal immediately results in mass storage device 11 stopping all current operations in progress and entering a power-up self-test state, during which time mass storage device 11 responds to microprocessor 302 with a "device not ready" indication that lasts several seconds. Operating software running on microprocessor 302 detects the device not ready indication as an error from the mass storage device and transfers control to appropriate error handling routines.

In addition, operating software may take advantage of facilities provided by command and status register 12 for enhanced operation. For instance, operating software may query the status of the fault indicator (preferably bit 7 as discussed above) to determine whether a "device not ready" indication received from mass storage device 11 was caused by an attempt to write to mass storage device 11. Additionally, operating software may enable a circuit that will allow a fault indication to generate an NMI (preferably via bit 5 as discussed above), which provides a more immediate means of transferring software operation to error handling routines.

A means is provided to enable writing data to mass storage device 11 by changing the state of jumper 17, for instance by inserting a jumper plug across pinheads or changing the setting of a switch. This typically occurs only during updates of software resident on mass storage device 11. To prevent write enable at other times, access to jumper 17 must be controlled via physical security methods, such as locks and seals covering the jumper or switch. For additional protection, operating software may be provided with a "maintenance" mode, distinct from normal operation, in which software resident on mass storage device 11 is updated. Operating software may periodically monitor the state of the jumper signal via control and status register 12. If it is determined that jumper 17 is installed and the operating software is not in maintenance mode, game play may be immediately ceased and control transferred to error handling routines.

Although the invention has been described with reference to specific exemplary embodiments, it will be appreciated that it is intended to cover all modifications and equivalents within the scope of the appended claims.

What is claimed is:

1. A mass storage data protection system for use with a mass storage device in a gaming machine, the mass storage data protection system comprising:

a mass storage device command latch for storing commands from a disk controller;

a timing circuit for timing signals between the mass storage device command latch and the mass storage device;

a comparator between the mass storage device command latch and the timing circuit; and a comparator command register in communication with the comparator, the comparator command register including ATA write commands wherein the comparator issues a fault when the mass storage device command latch stores a command matching an ATA command from the comparator command register.

2. A mass storage data protection system in accordance with claim 1 further comprising a control and status register in communication with the comparator command register and the comparator wherein the control and status register is configured to receive information from the comparator and to send information to the comparator command register and is operable to receive information from a jumper for enabling writing to the mass storage device.

3. A mass storage data protection system in accordance with claim 1 wherein the timing circuit comprises a synchronizer and a reset generator.

4. A mass storage data protection system in accordance with claim 1 wherein the mass storage device consists of an intelligent drive electronics hard disk drive and the mass storage device command latch consists of an intelligent drive electronics command latch.

5. A mass storage data protection system in accordance with claim 1 where in the comparator command register comprises a fixed command array and a user command array.

6. A mass storage data protection system for use with an intelligent drive electronics mass storage device in a gaming machine, the mass storage data protection system comprising:

an intelligent drive electronics mass storage device command latch for storing commands from a disk controller;

a timing circuit for timing signals between the intelligent drive electronics command latch and the intelligent drive electronics mass storage device, the timing circuit comprising a synchronizer and a reset generator;

a comparator comprising a fixed command array and a user command array, the comparator being located between the intelligent drive electronics command latch and the timing circuit;

a comparator command register in communication with the comparator, the comparator command register including ATA write commands; and a control and stains register in communication with the comparator command register and the comparator, wherein the control and status resister is configured to receive information from the comparator and to send information to the comparator command register and is operable to receive information from a jumper for enabling writing to the mass storage device and; wherein the comparator issues a fault when the intelligent drive electronics mass storage device command latch stores a command matching an ATA command from the comparator command register.

7. A gaming machine comprising:
a housing; at least one user input coupled to the housing,
a display coupled to the housing;
and a control system, the control system comprising:
   a mass storage device; and
   a mass storage data protection system, the mass storage data protection system comprising:
      a mass storage device command latch for storing commands from a disk controller;
      a timing circuit for timing signals between the mass storage device command latch and the mass storage device;
      a comparator between the mass storage device command latch and the timing circuit; and
      a comparator command register in communication with the comparator, the comparator command register including ATA write commands wherein the comparator issues a fault when the mass storage device command latch stores a command matching an ATA command from the comparator command resister.

8. A gaming machine in accordance with claim 7 further comprising a control and status register in communication with the comparator command register and the comparator, wherein the control and status register is configured to receive information from the comparator and to send information to the comparator command register and is operable to receive information from a jumper for enabling writing to the mass storage device.

9. A gaming in accordance with claim 7 wherein the timing circuit comprises a synchronizer and a reset generator.

10. A gaming machine in accordance with claim 7 wherein the mass storage device consists of an intelligent drive electronics hard disk drive and the mass storage device command latch consists of an intelligent drive electronics command latch.

11. A gaming machine in accordance with claim 7 wherein the comparator command register comprises a fixed command array and a user command any.

12. A gaming machine comprising:
a housing; at least one user input coupled to the housing;
a display coupled to the housing; and
a control system, the control system comprising:
   an intelligent drive electronics mass storage device; and
   a mass storage data protection system, the mass data protection system comprising:
      an intelligent drive electronics mass storage device command latch for storing commands from a disk controller;
      a timing circuit for timing signals between the intelligent drive electronics command latch and the intelligent drive electronics mass storage device, the timing circuit comprising a synchronizer and a reset generator;
      a comparator comprising a fixed command array and a user command array, the comparator being located between the intelligent drive electronics command latch and the timing circuit wherein the comparator issues a fault when the intelligent drive electronics mass storage device command latch stores a command matching an ATA command from a comparator command resister;
      the comparator command register in communication with the comparator, the comparator command register including ATA write commands; and
      a control and status register in communication with the comparator command register and the comparator, the control and status register wherein the control and status register is configured to receive information from the comparator and to send information to the comparator command register and is operable to receive information from a jumper or a write enable switch for enabling writing to the mass storage device.

13. A gaming machine in accordance with claim 12 wherein the control system further comprises: the write enable switch in communication with the comparator, the write enable switch being configured to suppress generation of a fault within the mass storage command latch when the write enable switch is close.

14. A gaming machine in accordance with claim 13, farther comprising: a microprocessor in communication with the mass storage device and the mass storage data protection system; and gaming machine operating software running on the microprocessor, the gaming machine operating software having at least a gaming mode and a maintenance mode, wherein the gaming machine operating software is configured to suspend gaming operation when the write enable switch is closed and the gaming machine operating software is in a mode other than the maintenance mode.

* * * * *

UNITED STATES PATENT AND TRADEMARK OFFICE
CERTIFICATE OF CORRECTION

PATENT NO. : 6,875,109 B2
DATED : April 5, 2005
INVENTOR(S) : Jim Stockdale

It is certified that error appears in the above-identified patent and that said Letters Patent is hereby corrected as shown below:

Column 6,
Line 64, change "stains" to -- status --
Line 66, change "resister" to -- register --

Column 7,
Line 28, change "resister" to -- register --
Line 47, change "any" to -- array --

Column 8,
Line 20, "resister" to -- register --
Line 38, change "close" to -- closed --
Line 40, change "farther" to -- further --

Signed and Sealed this

Twenty-eighth Day of June, 2005

JON W. DUDAS
*Director of the United States Patent and Trademark Office*